Oct. 1, 1968   C. MOUCHET   3,403,923
MANUALLY OPERATED CART OR WAGON
Filed Aug. 25, 1966   2 Sheets-Sheet 1
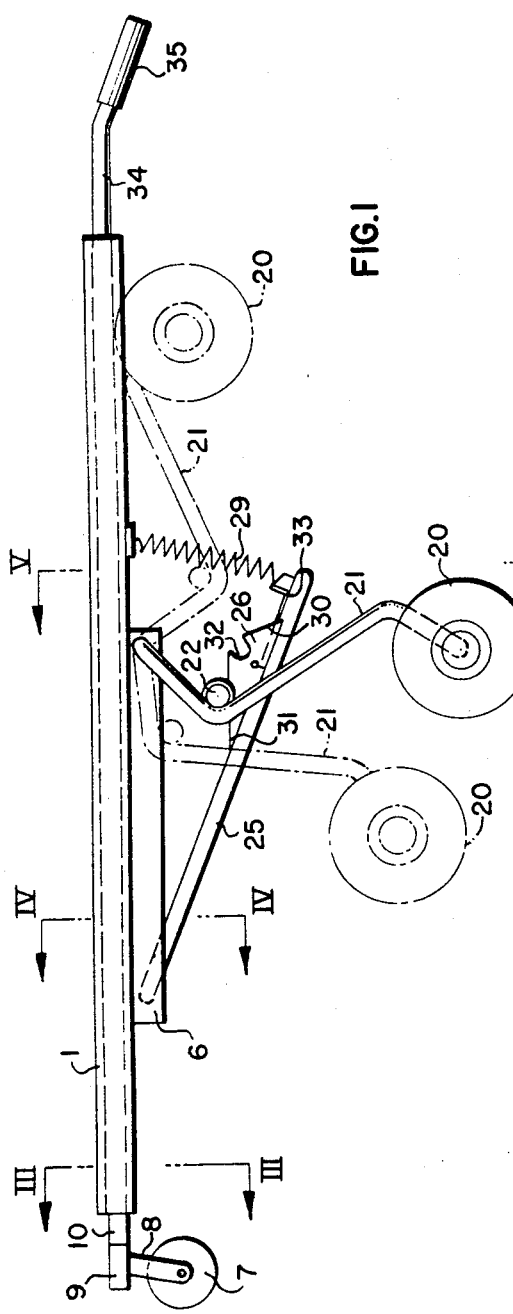
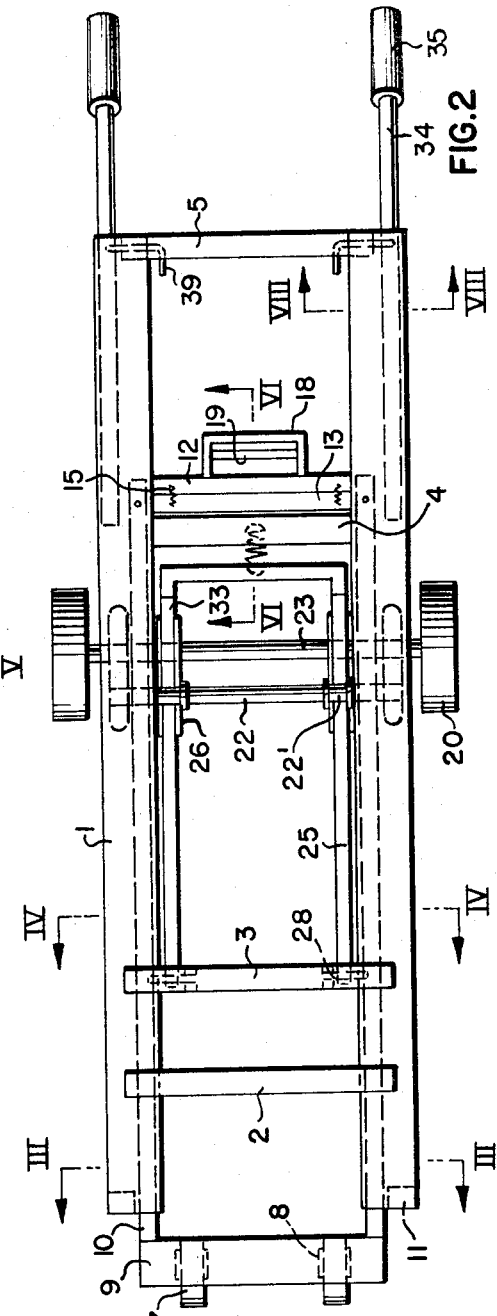
INVENTOR.
CLAUDE MOUCHET
BY Kelman and Berman
AGENTS Oct. 1, 1968     C. MOUCHET     3,403,923

MANUALLY OPERATED CART OR WAGON

Filed Aug. 25, 1966     2 Sheets-Sheet 2

*INVENTOR.*
CLAUDE MOUCHET
BY Kelman and Berman

AGENTS

United States Patent Office 3,403,923
Patented Oct. 1, 1968

3,403,923
MANUALLY OPERATED CART OR WAGON
Claude Mouchet, Saint-Philbert-de-Grandlieu, France, assignor to Manufacture d'Armes & Cycles de Chatellerault, Chatellerault, Vienne, France
Filed Aug. 25, 1966, Ser. No. 575,086
Claims priority, application France, Sept. 3, 1965, 2,151; Oct. 12, 1965, 2,162; Apr. 27, 1966, 59,410
4 Claims. (Cl. 280—43.1)

ABSTRACT OF THE DISCLOSURE

A hand-operated cart having front wheels at one end of a platform and handles at the other end. Another pair of wheels is attached to the platforms between the front wheels and the handles by pivoting struts which may be arrested in several angular positions at different vertical distances of the other wheels from the platform to facilitate loading and travel over stairs.

This invention relates to manually operated vehicles, and particularly to carts and wagons having two axle assemblies spaced in the direction of normal vehicle movement, and a handle arrangement which permits the vehicle to be operated with the wheel or wheels of either or both axle assemblies in contact with the ground or another supporting surface.

A vehicle of the type described may be operated in the manner of a wheel barrow when only the front wheel or wheels touch the ground, or as a cart when only the rear wheel or wheels touch the ground while the front wheels are lifted, and are generally adaptable to many types of operation, including operation as a wagon when all wheels share the load.

It is known to provide such vehicles with a platform and with axle assemblies which hold the front wheels nearer the platform than the rear wheels, and a vehicle so equipped can carry a load over a flight of stairs or over other irregular terrain without requiring the operator to lift the entire load. The wheels are alternatingly lifted off the ground by handles at the rear end of the platform while the load carrying wheels are moved along the top surface of a step until the lifted wheels may be set down on a step higher than that from which they were lifted.

It is further known pivotally to attach at least one of the axle assemblies to the platform, but the known vehicles of the last mentioned type lack the sturdiness and rigidity required in service when the vehicle is to move over stairs or similar terrain under heavy loads.

An object of the invention, therefore, is the provision of a manually operated vehicle of the type described and equipped with an axle assembly pivotally attached to the platform, which is sturdy and in which the wheels are firmly secured to the platform in the several angularly offset operating positions of the associated axle assemblies.

Another object is the provision of a vehicle in which the wheel base may be lengthened or shortened for optimum adaptation to the characteristics of steps over which a load supported on the vehicle platform is to be transported.

Yet another object is the provision of a vehicle in which all wheels may be shifted on the loading platform in the direction of vehicle movement to provide the most desirable spatial relationship between the center of gravity of a load secured on the platform and the supporting wheels.

With these and other objects in view, the invention in one of its aspects mainly resides in a vehicle having a wheeled front axle assembly near one longitudinal end of its loading surface and operating handles near the other end. A rear axle assembly is mounted on the vehicle platform for angular movement about an axis transverse of the direction of elongation of the loading surface and of the normal direction of vehicle movement. The rear axle assembly includes at least one, but preferably two rigid struts secured by pivots to the platform and carrying at least one, but preferably two rear wheels. The struts depend from the platform in a predetermined position defined by a vertical plane through the afore-mentioned axis and the center of gravity of the rear axle assembly, when the loading surface is horizontal and the rear axle assembly is free to swing about its axis under the force of gravity.

The struts may be locked to the platform in three angular positions. In the first angular position, the struts are offset toward the front axle assembly from the aforementioned predetermined position. In the second angular position, the struts are offset from the predetermined position thereof away from the front axle assembly. The third position is intermediate the second and predetermined positions of the struts. Yieldably resilient means are provided for moving the struts about their axis from the predetermined position toward the first angular position when released by the locking arrangement.

Other features, additional objects, and many of the attendant advantages of this invention will be readily appreciated as the same becomes better understood by reference to the following detailed description when considered in connection with the accompanying drawings in which:

FIG. 1 shows a wagon of the invention in side elevation;

FIG. 2 shows the wagon of FIG. 1 in top plan view;

Figure 3:
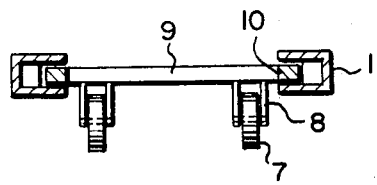
FIGS. 3 to 5 illustrate details of the wagon of FIGS. 1 and 2 in rear elevation and partly in section on the lines III—III, IV—IV, and V—V respectively.

Referring now to the drawing in detail, the wagon illustrated has a rigid, rectangular, platform mainly formed by two longitudinal members 1 transversely connected by cross members to define an elongated loading surface, only four cross members 2, 3, 4, 5, being shown for the sake of clarity. The longitudinal platform members 1 are U-channels whose open sides face each other. The central portion of each longitudinal member is stiffened by a bar 6 attached to the lower flange of the channel.

Figure 6:
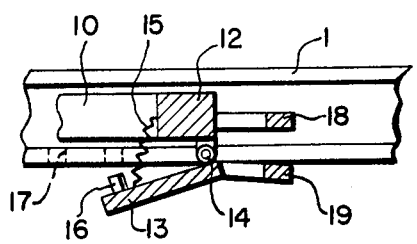
FIG. 6 shows yet another detail in side elevational section on line VI—VI in FIG. 2.

The two small front wheels 7 of the wagon are attached by brackets 8 to a cross member 9 at one end of an elongated frame whose longitudinal elements 10 are slidably received in the U-channels 1 and are laternally confined in the channels by guides 11 of which only two are shown. A cross member 12 which connects the rear ends of the frame elements 10 supports a transversely elongated plate 13 as is best seen in FIG. 6. One longitudinal edge of the plate 13 is fastened to the cross member 12 by hinges 14. Springs 15 attached to the cross member 12 urge the plate 13 to swing clockwise from the position shown in FIG. 6 for engagement of pins 16 on the plate 13 with openings 17 which are arranged in longitudinal rows in the lower flanges of the platform members 1. Fixed handles 18, 19 extend rearward from the cross member 12 and the plate 13, the handle 19 being angularly offset from the plate 13 so that the pins 16 are disengaged from openings 17 when the handles 18, 19 are moved toward each other against the restraint of the springs 15.

The rear or main wheels 20 of the wagon are rotatably attached to the remainder of a rear axle assembly mainly consisting of two parallel, S-shaped struts 21 connected by cylindrical cross bars 22, 23, the latter carrying the wheels 20, and the cross bar 22 being fixedly attached in respective bights of the two struts and carrying two flanged rollers 22'. Pivot pins 24 at the ends of the struts 21 remote from the wheels 20 engage the outer longitudinal faces of the stiffening bars 6 near the rear ends of the latter so that the rear axle assembly may swing between two terminal positions, respectively shown in FIG. 1 in dotted lines and in broken lines, the position illustrated in fully drawn lines being assumed by the rear axle assembly under the force of gravity when the wagon platform is horizontal and the assembly swings freely.

Figure 4:
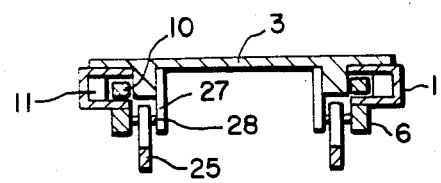
Figure 5:
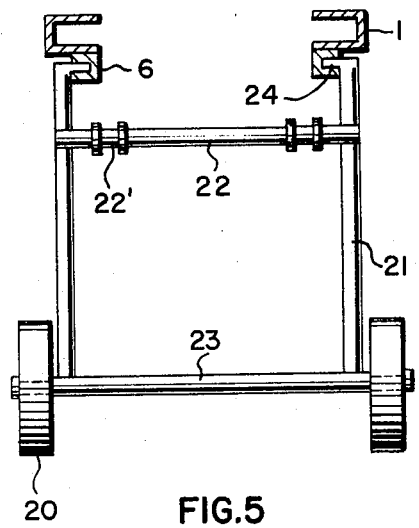

The rear axle assembly is held in its several load bearing positions by a locking arrangement mainly consisting of a U-shaped bar 25 and two pairs of identical cams 26 transversely aligned on the two legs of the U-shape. The free ends of the legs are attached to the wagon platform by two dependent brackets 27 on the cross member 3 and by pivot pins 28 which extend from respective brackets 27 to the inner longitudinal faces of the stiffening bars 6 near the front ends of the bars, as best seen in FIG. 4. The locking bar 25 extends through the opening in the rear axle assembly framed by the struts 21 and the cross bars 22, 23 in most operative positions of the rear axle assembly, and its bight portion is drawn toward the underside of the wagon platform by a strong helical tension spring 29 attached to the cross member 4.

The cams 26 project upwardly from the associated legs of the bar 25. Each cam has a steeply sloping face portion 30 and a more gently sloping portion 31 which are connected by a semi-cylindrical notch 32 dimensioned conformingly to receive the rollers 22' on the cross bar 22 of the rear axle assembly. A latch 33 pivotally mounted between the two cams 26 of each pair may be swung manually between two positions in which it abuts against the top face of the associated leg of the bar 25. As is best seen in FIG. 1, the latch 33 is a strip of metal whose ends are bent 90° in a common direction, the shorter end being pivoted to the cams 26, both ends projecting upward from the connecting middle portion of the latch 33 in the inoperative position seen in FIG. 1.

Figure 7:
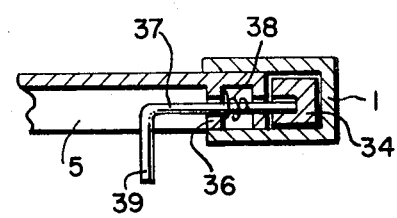
FIG. 7 shows further detail in front-elevational section on the line VII—VII in FIG. 2.

A bar 34 projects rearwardly from each U-channel 1, and its cylindrical free end carries a handle 35. Each bar 34 is guided in the associated U-channel by one of two lugs 36 on the cross member 5 as is best seen in FIG. 7 so that the bars 34 do not interfere with the longitudinal movement of the frame members 10 and vice versa. A row of horizontal openings arranged in longitudinal rows in each bar 34 may be engaged by locking pins 37 transversely slidable in aligned bores of the lugs 36 and biased toward locking engagement with the bars 34 by a spiral spring 38 coiled about the pin 37 between the two lugs 36 and having ends respectively attached to the pin 37 and one of the lugs 36. An angularly offset end portion 39 of each pin 37 is accessible as seen in FIG. 2 for adjusting the longitudinal position of the bar 34.

The wagon is operated as follows:

If heavy loads are to be transported, the rear axle assembly is preferably brought into the position illustrated in FIG. 1 in broken lines in which all four wheels are in contact with the ground when the platform is horizontal. The locking bar 25 is held out of engagement with the ground by the spring 29, the cross member 22 of the rear axle assembly abutting against the bar 25 between the cam face 30 and the longer end of the latch 33. If so desired, the rear wheels 20 may be lifted from the ground in the fully folded condition of the wagon by slightly changing the curvature of the struts 21 or by the use of smaller main wheels 20 than those illustrated.

In the folded position, the struts 21 abut against the underside of the members 1, the wagon occupies but a minimum of space for storage, and it may be loaded most conveniently. The load is secured on the wagon platform in a conventional manner, not further illustrated.

When the bars 34 are lifted by the handles 35, and the vehicle is pivoted about the axis of the front axle assembly, while the front wheels 7 are supported, the wheels 20 drop under their weight towards the fully drawn position. The cross bar 22 slides upward along the cam face portions 30 until it drops into the aligned recesses 32 of the cams 26 which are held against the bar 22 by the spring 29. The wheels 20 are now locked in a non-illustrated position intermediate the positions shown in FIG. 1 in fully drawn and in broken lines.

If it is desired to shift the wheels 20 forward nearer the small front wheels 7, the latter are preferably placed on a slightly elevated support, such as the edge of a loading platform, and the handles 35 are raised until the wheels 20 clear the ground. The transverse portion of the bar 25 is next depressed sufficiently for release of the cross bar 22 from the notches 32 whereupon the rear axle assembly is swung by gravity into a position similar to that illustrated in which the cross bar 22 is angularly offset from the notches 32 toward the front end of the wagon. A person holding the handles 35 may conveniently use a foot for briefly depressing the locking bar 25. When the bar is released, the strongly tensioned spring 29 swings the rear axle assembly clockwise from the fully drawn position toward the position indicated in dotted lines, whereupon the handles 35 may be lowered or released. The rear axle assembly is held in its forward position by abutting engagement of the cross bar 22 with the longitudinal platform members 1 and may further be secured by swinging the latch 33 through 180° until its longer end portion is placed immediately behind the cross bar 22 while the locking bar 25 is held close to the platform by the spring 29.

Depending on the distribution of the load on the wagon platform, and on the nature of the terrain over which the load is to be transported, the main wheels 20 of the wagon may thus be secured in three different longitudinal positions. The adjustment can normally be made by the person operating the wagon without leaving his normal station behind the handles 35. He may adjust the longitudinal position of the front wheels 7 in an equally simple manner.

When the handles 18, 19 are pressed toward each other, the pins 16 release the frame on which the wheels 7 are mounted from the platform member 1. The operator, while balancing the wagon on the main wheels 20, may shift the frame over a longitudinal distance substantially corresponding to the spacing of the cross members 4, 5 of the loading platform. The wheels 7 may thus be retracted behind the front end of the platform for convenient loading of drums or barrels. The wheels 7 are locked in position by releasing the handle 19 and then slightly moving the frame longitudinally by means of the handle 18 until the pins 16 drop into the nearest openings 17 under the urging of the springs 15.

Ultimately, the distance of the handles 35 from the wheels 7, 20 may be adjusted as needed after the locking pins 37 have been withdrawn. The wagon may stand on all four wheels during this adjustment.

The illustrated wagon may thus be adjusted for many conditions of service. It permits a load to be moved upward or downward over a set of steps while the loading platform remains substantially horizontal in a manner basically common to vehicles having two sets of wheels at different distances from their loading platform. The wheel base of the wagon of this invention, however, is adjustable in a manner not heretofore available with wagons of this type. The wheel base may thus be set for an optimum value according to the length of the steps, in the direction of movement, permitting the wagon to be operated on very steep stairs not capable of being negotiated by conventional vehicles of a similar type.

Other modes of operation available with the illustrated and described vehicle in the several adjusted positions of the wheels and the handles have partly been mentioned above and will otherwise readily suggest themselves to those skilled in the art.

A four-wheeled vehicle is preferred for transporting relatively heavy loads, but the use of a single wheel on either axle assembly or on both assemblies is specifically contemplated where relatively light loads are to be carried, and where maximum maneuverability is required.

Hollow structural members are preferred for all elements of the vehicle, and cylindrical tubes, where applicable, are most advantageous because they combine maximum stiffness with minimum weight. Solid bar members and elongated structural elements of non-circular cross section have been shown in the drawing partly for the sake of more convenient illustration, and it will be understood that the term "bar" as employed in this specification and the appended claims does not exclude a hollow bar or tube.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:
1. A manually operated vehicle comprising, in combination:
  (a) platform means defining a loading surface, said surface being directed upwardly in the normal operating position of the vehicle and being elongated in the direction of normal vehicle movement;
  (b) wheeled front axle means mounted on said platform means near one longitudinal end of said surface;
  (c) handle means mounted on said platform means near the other longitudinal end of said surface for lifting the corresponding end of said platform means;
  (d) rear axle means mounted on said platform means for angular movement about a first axis transverse of the direction of elongation of said surface,
    (1) said rear axle means including rigid strut means, pivot means securing one portion of said strut means to said platform means for movement about said first axis, and at least one wheel member on said strut means spaced from said axis,
    (2) said strut means depending from said platform means in a predetermined position when said surface is horizontal and said rear axle means is free to swing about said axis under the force of gravity;
  (e) locking means for releasably locking said strut means to said platform means in three angular positions relative to said axis,
    (1) said strut means, in a first one of said angular positions, being offset toward the front axle assembly from said predetermined position thereof,
    (2) said strut means in a second angular position being offset from said predetermined position away from said front axle means, and
    (3) the third position of said strut means being intermediate said second position and said predetermined position thereof;
  (f) yieldably resilient means for urging said strut means to move angularly about said axis from said predetermined position toward said first angular position when released by said locking means,
    (1) said locking means including a bar member pivoted to said platform means for movement about a second transverse axis spaced from said first axis in a direction toward said front axle means,
    (2) said resilient means urging said bar member to swing about said pivot axis toward said platform means; and
  (g) cooperating abutment means on said rear axle means and on said bar member for locking said strut means in said first and second positions under the tension of said resilient means and for displacing said strut means from said predetermined position toward said second position under said tension,
    (1) said cooperating abutment means including a cam member and a cam follower member engaging said cam member at a point offset from a vertical plane through said second axis toward said front axle means when said surface is horizontal and said strut means is in said predetermined position.

2. A vehicle as set forth in claim 1, wherein said platform means include two hollow members elongated longitudinally of said surface and transversely spaced from each other, two elongated elements being at least partly received in each of said hollow members for longitudinal movement relative to each other and to the receiving hollow member, said front axle means being attached to one of the elements in each hollow member and transversely connecting the attached elements, respective portions of the other elements projecting from the associated hollow members in a direction away from said front axle means and constituting said handle means, and releasable means for securing each of said elements in the associated hollow member in a plurality of longitudinal positions.

3. A vehicle as set forth in claim 1, wherein said bar member is formed with a notch, a portion of said rear axle means being received in said notch under the tension of said resilient means in said third position of said strut means.

4. A manually operated vehicle comprising, in combination:
  (a) platform means defining a loading surface, said surface being directed upwardly in the normal operating position of the vehicle and being elongated in the direction of normal vehicle movement;
  (b) wheeled front axle means mounted on said platform means near one longitudinal end of said surface;
  (c) handle means mounted on said platform means near the other longitudinal end of said surface for lifting the corresponding end of said platform means;
  (d) rear axle means mounted on said platform means for angular movement about an axis transverse of the direction of elongation of said surface,
    (1) said rear axle means including rigid strut means, pivot means securing one portion of said strut means to said platform means for movement about said axis, and at least one wheel member on said strut means spaced from said axis,
    (2) said strut means depending from said platform means in a predetermined position when said surface is horizontal and said rear axle means is free to swing about said axis under the force of gravity;
  (e) locking means for releasably locking said strut means to said platform means in three angular positions relative to said axis,
    (1) said strut means, in a first one of said angular positions, being offset toward the front axle asembly from said predetermined position thereof,
    (2) said strut means in a second angular position being offset from said predetermined position away from said front axle means, and
    (3) the third position of said strut means being intermediate said second position and said predetermined position thereof; and
  (f) yieldably resilient means for urging said strut means to move angularly about said axis from said predetermined position toward said first angular position when released by said locking means, (1) said strut means including two elongated substantially S-shaped strut members spaced from each other in the direction of said axis of angular movement, respective longitudinal end portions of said strut members being secured to said platform means by said pivot means, a plurality of cross bar members connecting said strut members to form therewith a rigid assembly, (2) respective portions of said strut members spaced from said end portions being offset from said axis obliquely away from said surface and toward said front axle means in said predetermined position of said strut means, one of said cross bar members connecting said offset portions of said strut members, (3) said locking means including a bar member pivotally attached to said platform means for movement about a transverse pivot axis spaced from said axis of angular movement toward said front axle means, (4) said resilient means engaging a portion of said bar member remote from said platform means for urging the engaged bar member portion toward a portion of the platform means spaced from said axis of angular movement away from said front axle means, and (5) cam means on said bar member, said cam means and said bar member being adapted to abuttingly engage said one cross bar member under the urging of said resilient means for locking said strut means against said platform means in said first and second position, (6) said cam means being formed with a notch receiving said one cross bar member in said third position of the strut means under the urging of said resilient means.

References Cited

UNITED STATES PATENTS

| | | | |
|---|---|---|---|
| 408,568 | 8/1889 | Amos | 280—43.1 |
| 602,504 | 4/1898 | Garner | 280—47.17 |
| 795,592 | 7/1905 | Edick | 280—43.1 |
| 893,763 | 7/1908 | Turner | 280—43.17 |
| 1,368,619 | 2/1921 | Fleuny | 280—35 |
| 2,728,584 | 12/1955 | Brown | 280—47.26 |

FOREIGN PATENTS 1,214,269  4/1960  France.

BENJAMIN HERSH, *Primary Examiner.*

J. SIEGEL, *Assistant Examiner.*